Feb. 25, 1964 R. G. ALTHERR 3,122,219
BRAKE HEAD MOUNTING
Filed Oct. 30, 1961 2 Sheets-Sheet 1

Witness: Robert O. Velte

INVENTOR.
Russell G. Altherr
BY Walter L. Schlegel, Jr.
Atty.

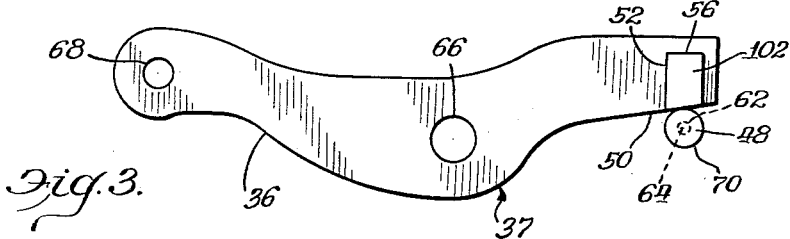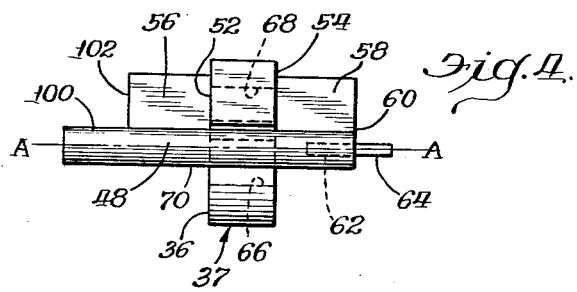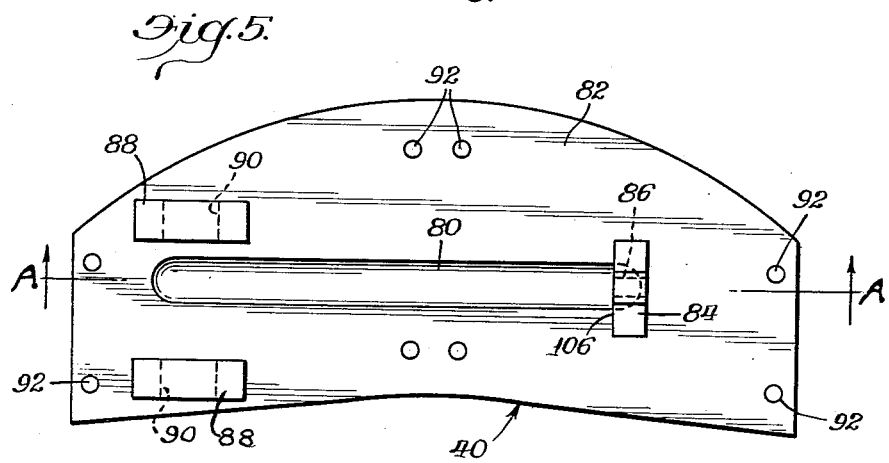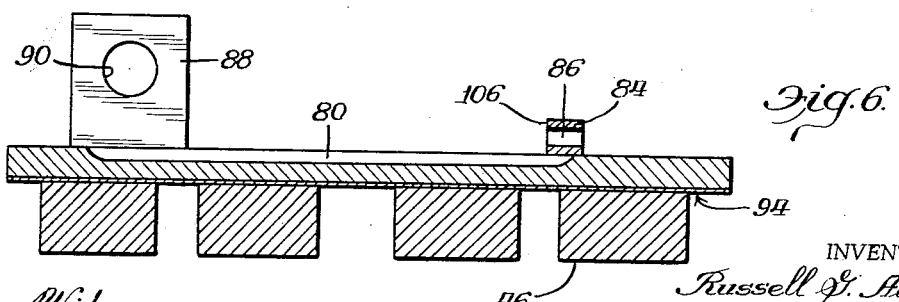

… … …

United States Patent Office 3,122,219
Patented Feb. 25, 1964

3,122,219
BRAKE HEAD MOUNTING
Russell G. Altherr, Munster, Ind., assignor to Amsted Industries Incorporated, Chicago, Ill., a corporation of New Jersey
Filed Oct. 30, 1961, Ser. No. 148,416
9 Claims. (Cl. 188—59)

This invention relates to brakes and more particularly to a head mounting for rotor brakes on railway cars.

This invention comprehends a mounting and linking arrangement for a brake head assembly particularly adapted for application to railway car trucks wherein the brake head assembly is located inboard from its adjacent wheel. Due to the positioning of the brake heads, inboardly behind the wheel, it may be difficult to perform maintenance, inspection, or replacement of the brake heads unless they can be easily removed.

An object of my invention is to provide a mounting arrangement to facilitate removal or replacement of the brake heads.

Another object is to provide such a mounting arrangement that is of rugged and simple construction and having relatively few parts.

Other objects and advantages will be apparent from an examination of the following description and drawings wherein:

FIGURE 3 is a top view of one brake lever shown in FIGURES 1 and 2;

FIGURE 4 is an end view of the brake lever illustrated in FIGURE 3;

FIGURE 5 is a side view of one brake head shown in FIGURES 1 and 2; and

FIGURE 6 is a sectional view along the line A—A of FIGURE 5.

Figure 2:
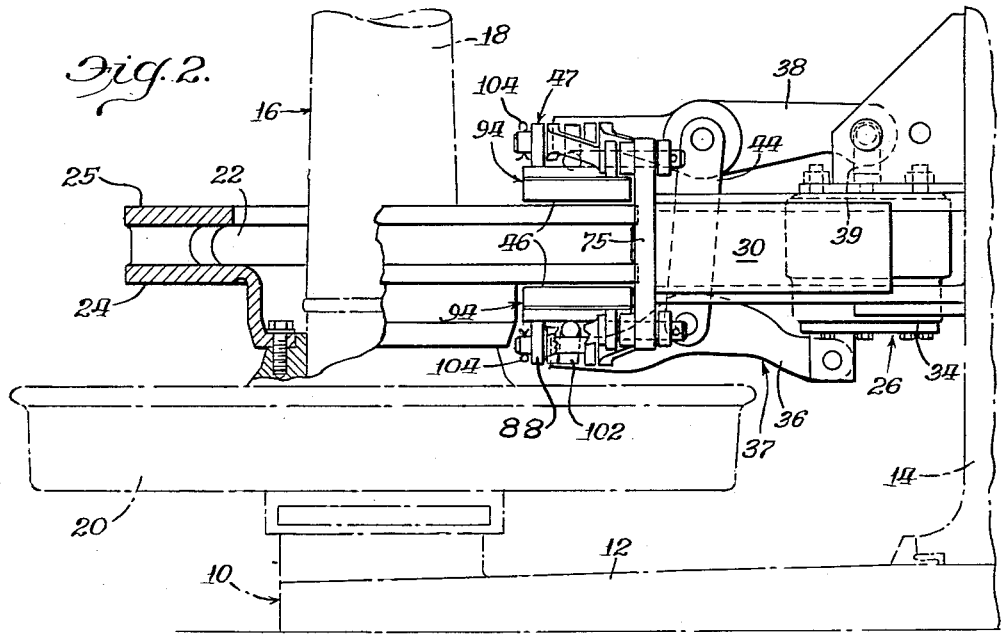
FIGURE 2 is a top view of that structure illustrated in FIGURE 1.
Figure 1:
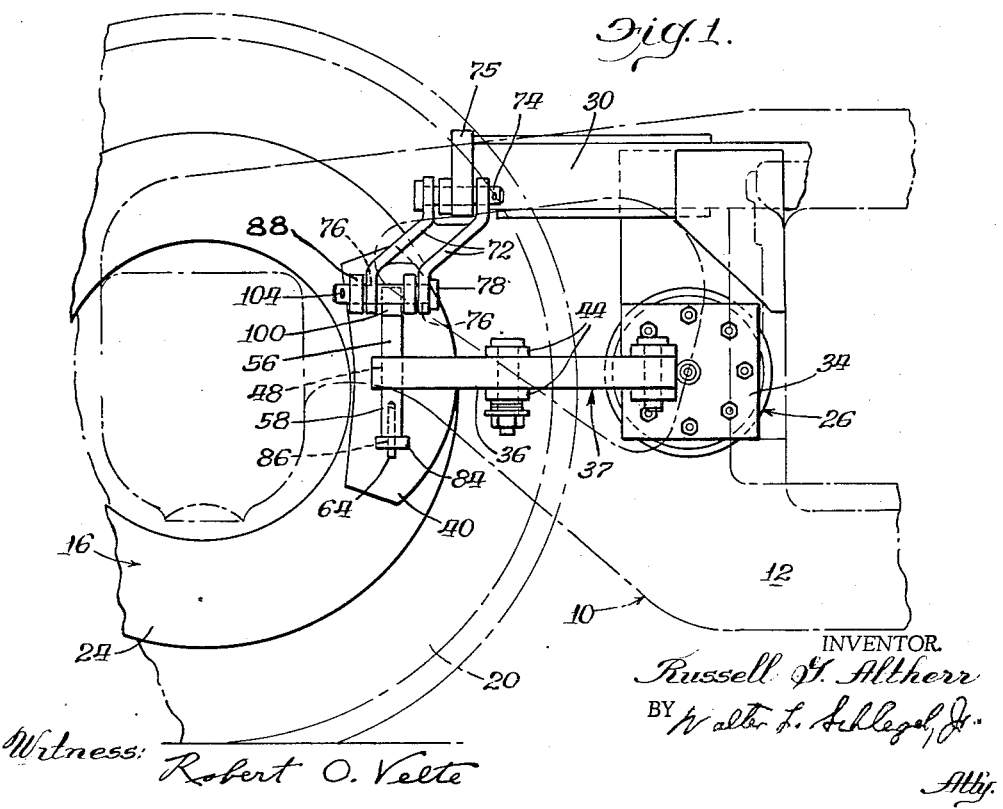
FIGURE 1 is a fragmentary side view of a railway freight car truck having a brake arrangement embodying my invention.

It will be understood that certain elements have been omitted from certain views where they are better illustrated in other views.

Referring now to the drawings for a better understanding of the invention, it will be seen that a rotor brake arrangement embodying features of my invention is shown as applied to a railway car truck having a truck frame generally indicated at 10, which comprises a pair of spaced side frames, one of which is shown at 12 interconnected by a bolster 14 having each end resiliently supported (not shown) in a conventional manner on one of the side frames.

Each side frame may be provided at each end with conventional journal means (not shown) for journally receiving one end of a wheel and axle assembly indicated generally at 16, which comprises an axle 18 having secured thereto a pair of wheels 20 (only one of which is shown) and a rotor 22 which presents oppositely facing, axially spaced, outboard and inboard friction surfaces, 24 and 25, respectively.

The brake mechanism indicated generally at 26 may be rigidly supported from a yoke structure 30 on the bolster 14.

The brake mechanism 26 may comprise a rigidly mounted power actuating device 34. One end of an outboard actuating dead lever 36 of a lever assembly 37 is pivotally connected to the power device 34 and an inboard actuating lever 38 is pivotally connected to piston 39 of the power device 34. The opposite ends of the levers 36 and 38 are operatively connected to the outboard and inboard brake heads 40 and 42, respectively, in a manner hereinafter described. Outboard lever 36 and inboard lever 38 may be pivotally interconnected intermediate their ends by a pair of floating fulcrum bars or links 44. Operation of the power actuating device 34 at the pivoted end of levers 36 and 38 causes the opposite ends of the levers to move inwardly resulting in the brake shoe bearing surface 46 of both heads 40 and 42 to engage the outboard and inboard frictional surfaces, 24 and 25, respectively, of rotor 22.

The mounting of the outboard brake head 40 to the outboard actuating lever assembly 37, and to the yoke structure 30 is essentially the same as that of the inboard brake head 42 to its associated lever assembly. Therefore; the described means for mounting, and FIGURES 3 to 6, are drawn for the outboard brake head 40 and operating lever assembly 37. Corresponding inboard members are the same except reversed to actuate the brake head 42 outboardly, as best seen in FIGURE 2.

As best seen in FIGURE 3, a rod 48 is preferably welded on the vertical inboard surface 50 of lever 36 near its outer end. Rod 48 is oriented with its longitudinal axis extending vertically above and below a top surface 52 and a bottom surface 54 of lever 36. An upper reinforcement lug 56, substantially of the same width as the diameter of rod 48, is preferably welded in a vertical position to the upper surface 52 and the adjacent portion of rod 48. Lug 56 preferably extends to a lesser height above surface 52 than rod 48 does for reasons hereinafter shown. A second reinforcement lug 58 may be welded to the lower surface 54 and the adjacent portion of rod 48. Lug 58 is preferably mounted on the same side of rod 48 as lug 56, but at the opposite side of lever 36 and may extend to substantially the lower end of rod 48. The bottom surface 60 of rod 48 is provided with an opening 62, concentric with the longitudinal axis A—A of rod 48, and is adapted to retain a roll pin 64 extending outwardly therefrom.

Actuating lever 36 may be provided with a hole 66 intermediate its ends to be pivotally connected to links 44, and a second hole 68 at the pivotal end of rod 48 to pivotally support it from the power actuating device 34. An inboardly arcuate surface 70 extending the full length of vertically disposed rod 48 engages a portion of the brake head 40 as hereinafter described.

As best seen in FIGURE 2, a pair of brake head hangers 72 are pivotally suspended from one of their ends in a fixed, spaced relationship to each other by horizontally aligned retaining pin 74, extending through a flange 75 of the yoke 30. Each of the lower ends of the hangers 72 is provided with a hole 76 adapted to receive a horizontally disposed retaining pin 78. Brake head 40 is pivotally connected to the lower ends of hangers 72 by the pin 78, as hereinafter described.

As best seen in FIGURES 5 and 6, brake shoe 40 is provided with a substantially vertical groove 80 disposed generally centrally in outboard surface 82. A horizontally disposed bottom holding lug 84 is welded onto surface 82 so as to straddle the lower end of groove 80. An opening 86 centrally through lug 84 is vertically aligned with groove 80.

A pair of horizontally spaced mounting lugs 88, welded to surface 82, are disposed, on opposite sides of groove 80, near its upper end. An opening 90 is provided centrally through each of lugs 88. The opening 90 is adapted to receive brake head retaining pin 78 to suspend the head 40 from the hangers 72.

Brake head 40 may be provided with a plurality of rivets 92 to retain a brake shoe 94 to an inboard surface 96 of the head 40.

Roll pin 64 in rod 48 is adapted to be received in opening 86 in lug 84 and when so engaged, inboard surface 70 of rod 48 substantially fills groove 80 throughout its full length. Opening 86 is slightly larger in diameter than roll pin 64 so that the upper end of rod 48 may be moved outwardly with respect to groove 80 to facilitate insertion and removal of the roll pin 64 with respect to opening 86 without binding during assembly and disassembly. During braking action inboard surface 70 of rod 48 engages groove 80 and moves the entire head inboardly until brake shoe bearing surface 46 engages the outboard friction surface 24 on the rotor. Inboard surface 70 must fit snuggly enough into groove 80 so that no shearing or bending of the roll pin 64 is caused by side thrust against the lug 84, during braking action.

The upper portion 100 of rod 48 above lug 56 is between the upper end of groove 80 and the inboard side of retaining pin 78. Accordingly, the accidental disengagement of rod 48 from brake 40 is prevented. That is, rod 48 is generally confined within groove 80 by retaining pin 78 being received within openings 90 of lugs 88. Lug 56 has an upper end 102 formed so as to abut against the lower side of retaining pin 78 before pin 64 can be fully withdrawn from its cooperating opening 86. In view of the above, it can be seen that retaining pin 78 maintains rod 48 in rockable engagement with brake head 40 and cooperates with upper surface 102 of lug 56 to prevent rod 48 from being disengaged from brake head 40 unless pin 64 has been withdrawn from opening 86 of holding lug 84.

Pin 78 is adapted to pass alternately through the aligned openings 76 and 90 in hangers 72 and lugs 88, respectively, on each side of groove 80. Pins 78 may be adapted to receive a cotter pin 104, opposite the head end, to retain it in operative position.

To remove the brake head 40, it is only necessary to remove cotter pin 104, withdraw retaining pin 78 disengaging it from the hangers 72, drop the head 40 slightly to clear roll pin 64, shift the head 40 inboard slightly to clear the upper surface 106 of lug 84 with respect to the bottom surface 60 of the rod 48 and then lift the head straight up from the lever.

It is understood that various modifications may be made in the form of this device, herein shown and described, and that shown is to be taken as a preferred example of the same, and that various changes of the size, shape and arrangement of parts may be resorted to, without departing from the spirit of my invention, or the scope of the following claims.

I claim:

1. In a brake arrangement for a vehicle, a combination of: a pair of spaced side frames interconnected by a bolster resiliently supported therebetween, one end of a wheel and axle assembly journally received at each end of said side frames, a rotor mounted on said axle presenting oppositely facing, axially spaced inboard and outboard frictional surfaces, a yoke structure secured to said bolster, and a brake mechanism including a power actuating device having an actuating piston, an inboardly actuating lever having the inward end pivotally connected to said actuating piston, an outboardly actuating dead lever having its inward end pivotally connected to the power device, a pair of floating fulcrum bars, each having one end pivotally connected to said inboardly actuating lever and the other end pivotally connected to said dead lever, intermediate the ends of said levers, said fulcrum bars being disposed on the upper and lower sides of each of said levers, an outboardly brake head and an inboardly brake head, each having a brake shoe carried thereon at times engageable with said outboard and inboard frictional surfaces, a pair of brake head hangers pivotally suspended at the upper end thereof from said yoke structure for each of said brake heads, each of said levers carrying a vertically disposed rod adjacent its associated brake head, a pin extending axially from the lower end of said rod, each of said brake heads having a vertically disposed groove adapted to receive said rod permitting rockable abutment therebetween as the brake levers actuate the brake heads by pressure of the brake lever applied to said brake head abutment, said brake head having a bottom lug thereon at the lower end of said groove, said bottom lug having an opening therein adapted to receive said pin, said brake head having a retainer lug disposed on each side of the upper ends of said groove, a brake head retaining pin adapted to pivotally suspend said brake head, said brake head retaining pin passing through openings in the lower ends of said hangers and through said retaining lugs, said rod having its upper end retained between said groove and the inboard surface of said brake head retaining pin, said brake head being removable from said lever, after removal of said head retaining pin, by moving the head downwardly until said pin carried by said rod is released from said opening, and removable retaining means to prevent withdrawal of the head retaining pin.

2. In a brake arrangement for a vehicle comprising a structure supported by a wheel and axle assembly with a rotatable brake surface, the combination of a brake head having a brake shoe engageable with said brake surface, a pair of spaced mounting lugs on said brake head, a pair of brake head hangers spaced horizontally from each other and pivotally suspended from said structure, a horizontally disposed brake head retaining pin passing through openings in the lower end of said brake hangers and said spaced mounting lugs, said brake head having a groove on its outboard side, extending downwardly from between said spaced mounting lugs, a bottom lug disposed across the lower end of said groove having an opening therein, an actuating lever having a substantially vertical rod secured thereto, a pin extending axially from the lower end of said rod, said pin being retained in said opening in said lower lug to hold said rod in rockable engagement with said groove, said rod having its inboardly surface engaged with said groove and being effective when urged by said actuating lever to urge said brake shoe into engagement with said brake surface, said rod having its upper end confined between the upper end of said groove and the brake head retaining pin, said brake head being removable by first removing said head retaining pin, then moving said head downwardly until said pin in said rod is removed from said opening.

3. In a brake arrangement for a vehicle comprising a structure supported by a wheel and axle assembly with a rotatable brake surface, the combination of a brake head carrying friction means for engagement with said surface, a pair of spaced mounting lugs on said brake head, a pair of spaced brake head hangers having one end pivotally suspended from said structure, a brake head retaining pin passing through openings in the other ends of said brake hangers and said spaced mounting lugs, thereby pivotally suspending said brake head to said hangers, an actuating lever having a substantially perpendicular member attached thereto for rockable abutment with said brake head, said member having a pin extending from a first end of said member, said pin being received by an opening in a lug mounted on said brake head, said member having a second end confined against said brake head by said spaced mounting lugs and said retaining pin, a reinforcement lug secured outboardly on said member and located near said second end and having an upper surface spaced from said second end, said upper surface being effective to abut said retaining pin before said pin can be withdrawn from said opening and thereby prevent said member from being disengaged from said head unless said retaining pin has been removed from said spaced mounting lugs.

4. In a brake arrangement for a vehicle comprising a structure supported by a wheel and axle assembly with a rotatable brake surface, the combination of a brake head carrying frictional means for engagement with said surface, hanger means pivoted to the head and structure, an actuating lever and a cross-member secured together forming a substantially T shape, and a pin connected to and extending beyond one end of said cross-member, the other end of said cross-member being confined between said head and a retaining means connected to a portion of said hanger means to hold the cross-member and head in assembled relationship, said brake head having integral means thereon with an opening receiving said pin, said cross-member when urged by said actuating lever rockably abutting the head to urge said frictional means into engagement with said brake surface, said other end of said cross-member being released, after disconnection of said hanger means from said head, thereby permitting removal of said head from said lever by moving said head so as to release the pin from the pin accommodating means.

5. In a brake arrangement for a vehicle comprising a structure supported by a wheel and axle assembly with a rotatable brake surface, the combination of a brake head carrying friction means for engagement with said surface, hanger means releasably pivoted to the head and structure for transmitting brake torque to the structure, a pivotally mounted lever having a portion in rockable abutment with the head for actuation thereof, said portion being releasably confined between the head and hanger means, and a pin carried by the lever below said abutment and received within a complementary opening in an integral portion of said brake head for moving the latter to released position, said pin being connected to said lever only above said portion, whereby upon disconnection of the head from said hanger means, the head may be disconnected from the lever by moving the head downwardly until the pin is released from said opening.

6. In a brake arrangement for a vehicle having a structure supported by a wheel and axle assembly with a rotatable brake surface, the combination of:
A. a brake head carrying means for engagement with said surface;
B. hanger means pivoted to the brake head and to the structure for transmitting brake torque to the latter;
C. a brake lever having rockable abutment with the brake head for relative rockable movement on a certain axis as the brake lever actuates the brake head by pressure of the brake lever applied to the brake head at said abutment;
D. a pin connected to the lever at the upper end of said pin, said pin
   (a) having a longitudinal axis parallel to the first-mentioned axis and
   (b) being received within a complementary opening of an integral part of the brake head at a point below said abutment and below said lever;
E. said brake head and said lever being relatively movable along the first-mentioned axis to release the brake head from the pin by downward movement of the brake head when the brake head is disconnected from the hanger means, retaining means on the hanger means and abutment means on the lever to limit upward movement of the lever to an amount whereby the brake head is prevented from accidental release from the pin.

7. A brake head arrangement for a railway brake assembly, comprising an elongated brake head body member, an elongated recess formed in one surface of said body member generally longitudinally of said body member, a holding member secured to said body member, an opening formed through said holding member, said holding member being so positioned on said body member as to have the longitudinal axis of said recess and the axis of said opening generally parallel to each other, a plurality of retaining members secured to said body member in a manner so as to be disposed on opposite sides of said recess, first and second retaining holes formed respectively through said retaining members in general axial alignment with each other, an actuating lever assembly removably connected to said body member, said actuating lever assembly comprising a lever member pivotally connected to a brake assembly actuating member, an elongated bearing member secured to said lever member in a manner whereby the longitudinal axis of said bearing member is generally parallel to the axis of said pivotal connection of said lever member, said bearing member being slidably received within said recess in rockable engagement with said body member in said recess, a projection formed on one end of said bearing member loosely received within said opening, a retaining pin received through said first and second retaining holes in a manner whereby a portion of said bearing member is located between said body member and said retaining pin, and an abutment member secured to said lever assembly, said abutment member being positioned so as abut against said retaining pin during relative longitudinal movement of said body member and said bearing member in order to limit said relative longitudinal movement to an amount whereby accidental withdrawal of said projection from said opening is prevented.

8. In combination, a brake head carrying on one side thereof friction means for decelerating a moving surface, a mounting lug on the opposite side of said head, a hanger having means at one end for pivotal connection to a supporting structure, releaseable brake head retaining means passing through openings in said lug and said hanger for pivotally connecting the head to the hanger, an actuating lever having a substantially perpendicular member attached thereto, said member rockably abutting said opposite side of the head, said member having a pin extending from one end of said member, a lug permanently attached to said opposite side of the head and having an opening receiving said pin below said lever, said member having another end received between said hanger and mounting lug and retained therebetween by said releasable means.

9. In combination, a brake head carrying on one side thereof a friction face for decelerating a moving surface, a brake lever having a fulcrum axis, a brake head actuator member carried by the lever and rockably engaged with the opposite side of the head for actuation thereof in such manner that the head may rock relative to said member on an axis parallel to the first-mentioned axis as said friction face engages said surface, said member having a longitudinal axis substantially parallel to said fulcrum axis and said rocking axis, a pin on one end of said member received within an opening in an integral part of the brake head below the lever, the longitudinal axis of the pin being coaxial with that of said member, brake hanger means for pivotally connecting the head to a supporting structure, and readily releasable means connected to the head and hanger means for pivotally connecting the head to the hanger means, said readily releasable means releasably abutting said member along a surface thereof above the lever and facing away from the head to hold the member in said rockable engagement therewith.

References Cited in the file of this patent

UNITED STATES PATENTS

| | | |
|---|---|---|
| 867,144 | Lee | Sept. 24, 1907 |
| 1,451,599 | Teague | Apr. 10, 1923 |
| 1,752,686 | Nagle | Apr. 1, 1930 |
| 2,877,871 | Tack | Mar. 17, 1959 |
| 2,972,313 | Herbert | Feb. 21, 1961 |